(12) United States Patent
Karamanos et al.

(10) Patent No.: US 12,180,762 B2
(45) Date of Patent: *Dec. 31, 2024

(54) LEAFLESS JOINT SYSTEM THAT PIVOTS AND SLIDES

(71) Applicant: Best Technologies, Inc., Reno, NV (US)

(72) Inventors: John C. Karamanos, San Jose, CA (US); Herbert Willke, New York, NY (US)

(73) Assignee: BEST TECHNOLOGIES, INC., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,149

(22) Filed: Oct. 19, 2023

(65) Prior Publication Data

US 2024/0044190 A1 Feb. 8, 2024

Related U.S. Application Data

(63) Continuation of application No. 18/169,915, filed on Feb. 16, 2023, now Pat. No. 11,859,422, which is a
(Continued)

(51) Int. Cl.
*E05D 1/00* (2006.01)
*E05D 1/06* (2006.01)
(Continued)

(52) U.S. Cl.
CPC .............. *E05D 1/06* (2013.01); *E05D 5/0276* (2013.01); *E06B 3/5063* (2013.01); *H02G 3/14* (2013.01); *H02B 1/46* (2013.01)

(58) Field of Classification Search
CPC ....... E05D 1/06; E05D 5/0276; E06B 3/5063; H02G 3/14; H02B 1/46
See application file for complete search history.

(56) References Cited

U.S. PATENT DOCUMENTS 2,086,534 A 7/1937 Byrne
2,606,774 A 8/1952 Joseph
(Continued)

OTHER PUBLICATIONS

U.S. Appl. No. 17/843,360, filed Jun. 17, 2022.
(Continued)

*Primary Examiner* — Pete T Lee
(74) *Attorney, Agent, or Firm* — Amin, Turocy & Watson, LLP

(57) ABSTRACT

A leafless joint apparatus that couples a housing structure to a hatch structure such as a cover or door. Similar to previous hinge apparatuses, the leafless joint apparatus can include a knuckle and a pintel or pin to facilitate pivot operations (e.g., the cover pivoting open). However, the leafless joint apparatus does not rely on leafs that attach by means of fasteners (e.g., screws or the like) and therefore can facilitate sliding operations (e.g., the cover can slide open). Thus, the leafless joint apparatus can facilitate access to an interior of the housing structure by way repositioning the hatch structure via a pivot or hinging operation or via a sliding operation that can partially or fully expose the interior of the housing structure and even, if desired, slide entirely off, decoupling from the housing structure.

20 Claims, 9 Drawing Sheets

Related U.S. Application Data continuation of application No. 17/843,360, filed on Jun. 17, 2022, now Pat. No. 11,608,667, which is a continuation of application No. 15/876,803, filed on Jan. 22, 2018, now abandoned, which is a continuation of application No. 14/735,726, filed on Jun. 10, 2015, now abandoned.

(51) Int. Cl.
  *E05D 5/02* (2006.01)
  *E06B 3/50* (2006.01)
  *H02G 3/14* (2006.01)
  *H02B 1/46* (2006.01)

(56) References Cited

U.S. PATENT DOCUMENTS

| | | | |
|---|---|---|---|
| 2,852,802 | A | 9/1958 | Joel |
| 3,441,975 | A | 5/1969 | Shepherd |
| 3,516,114 | A | 6/1970 | Joyce |
| 4,373,687 | A | 2/1983 | Zicko |
| 4,556,044 | A | 12/1985 | Barsness et al. |
| 5,673,811 | A * | 10/1997 | Dickinson ............ B65D 43/164 220/815 |
| 5,769,261 | A * | 6/1998 | Gaffney .................... E05D 1/06 220/212.5 |
| 6,461,026 | B1 | 10/2002 | Wang |
| 6,726,049 | B2 * | 4/2004 | Brothers ................ A47G 19/26 220/744 |
| 7,900,582 | B2 | 3/2011 | Yu |
| 8,474,099 | B2 | 7/2013 | Hung |
| 9,373,944 | B2 | 6/2016 | Scanzillo et al. |
| 2004/0000030 | A1 | 1/2004 | Pleiman et al. |
| 2007/0062953 | A1 | 3/2007 | Lin |
| 2008/0264664 | A1 | 10/2008 | Dinh et al. |
| 2018/0141725 | A1 | 5/2018 | Karamanos et al. |

OTHER PUBLICATIONS

U.S. Appl. No. 15/876,803, filed Jan. 22, 2018.
U.S. Appl. No. 18/169,915, filed Feb. 16, 2023.
Non-Final Office Action received for U.S. Appl. No. 14/735,726 dated Jul. 7, 2016, 14 pages.
Final Office Action received for U.S. Appl. No. 14/735,726 dated Jan. 11, 2017, 11 pages.
Non-Final Office Action received for U.S. Appl. No. 14/735,726 dated Aug. 7, 2017, 11 pages.
Final Office Action received for U.S. Appl. No. 14/735,726 dated Feb. 1, 2018, 9 pages.
Non-Final Office received for U.S. Appl. No. 14/735,726 dated Jul. 26, 2018, 10 pages.
Final Office Action received for U.S. Appl. No. 14/735,726 dated Dec. 6, 2018, 10 pages.
Non-Final Office Action received for U.S. Appl. No. 14/735,726 dated Apr. 29, 2019, 10 pages.
Non-Final Office Action received for U.S. Appl. No. 15/876,803 dated Aug. 16, 2019, 35 pages.
Final Office Action received for U.S. Appl. No. 15/876,803 dated Nov. 27, 2019, 18 pages.
Non-Final Office Action received for U.S. Appl. No. 15/876,803 dated Jul. 20, 2021, 15 pages.
Final Office Action received for U.S. Appl. No. 15/876,803 dated Dec. 17, 2021, 12 pages.
Non Final Office Action received for U.S. Appl. No. 17/843,360 dated Aug. 19, 2022, 10 pages.
Notice of Allowance received for U.S. Appl. No. 17/843,360 dated Nov. 16, 2022, 28 pages.
Notice of Allowance received for U.S. Appl. No. 18/169,915 dated Jul. 24, 2022, 30 pages.

* cited by examiner

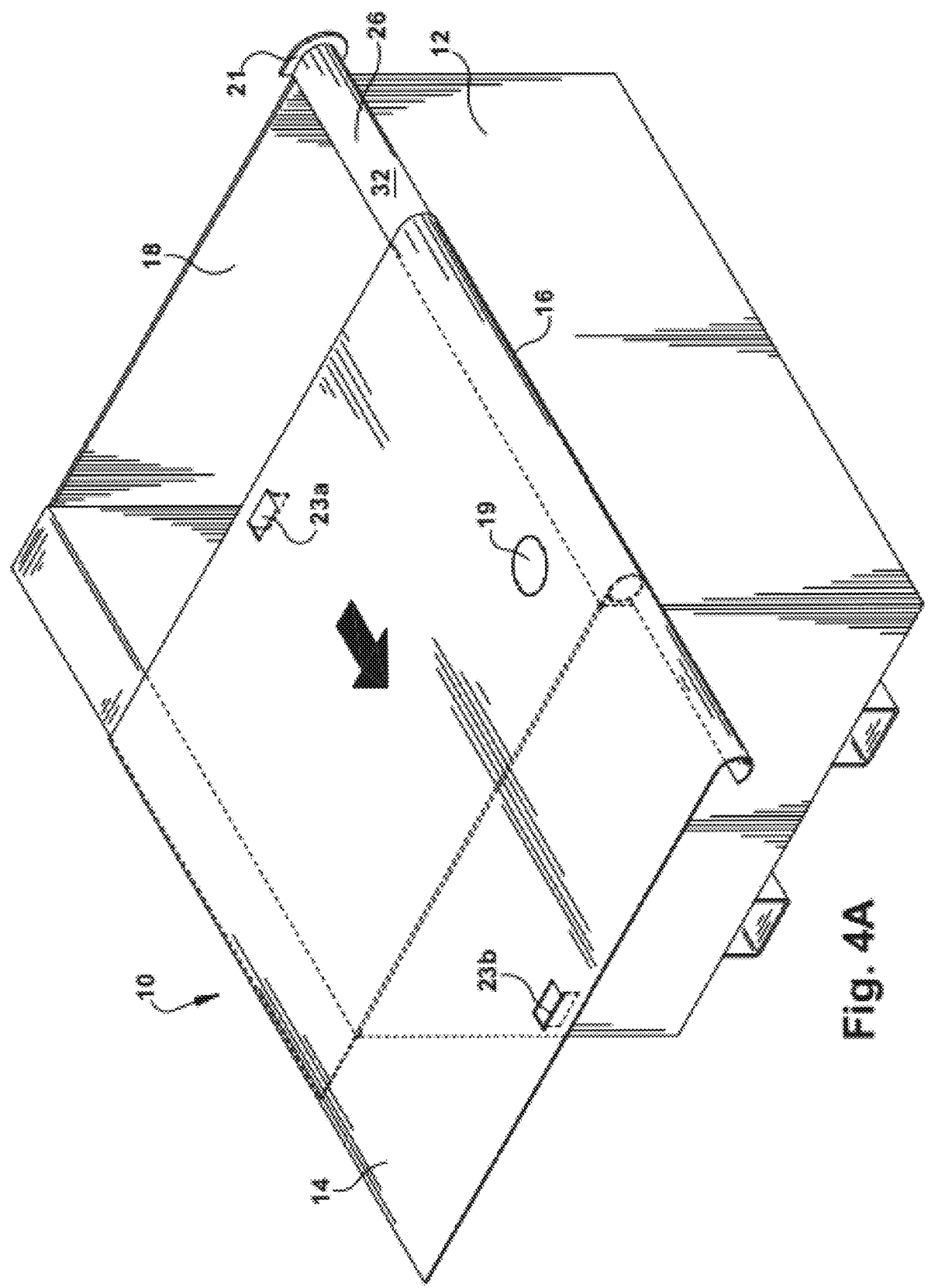

LEAFLESS JOINT SYSTEM THAT PIVOTS AND SLIDES

CROSS-REFERENCE TO RELATED APPLICATION

The present application is a continuation of, and claims priority to each of: U.S. patent application Ser. No. 18/169,915 filed on Feb. 16, 2023 and entitled "LEAFLESS JOINT SYSTEM THAT PIVOTS AND SLIDES", which is a continuation of U.S. patent application Ser. No. 17/843,360 (now U.S. Pat. No. 11,608,667) filed on Jun. 17, 2022 and entitled "LEAFLESS JOINT SYSTEM THAT PIVOTS AND SLIDES", which is a continuation-in-part of U.S. patent application Ser. No. 15/876,803 filed on Jan. 22, 2018 and entitled "UNIVERSAL ENCLOSURE ATTACHMENT", which is a continuation of U.S. patent application Ser. No. 14/735,726, filed Jun. 10, 2015, and entitled "UNIVERSAL ENCLOSURE ATTACHMENT," the entireties of each of which are hereby incorporated by reference herein.

FIELD OF THE INVENTION

This invention pertains generally to a leafless joint apparatus that facilitates attachment of lids, covers, hatches, or doors to enclosures or housings such as HVAC or other control boxes or the like that can have clearance issues when opening the cover to access interior contents, and more particularly to a leafless joint apparatus that allows a hatch to be either swung open (e.g., hinge or pivot), slide open, or be detached from the enclosure that is attached thereto.

BACKGROUND OF THE INVENTION

A joint apparatus is an interface between two adjacent bodies or elements, often providing a function of certain constrained movement of one of the adjacent bodies relative to the other. As one example, a joint can operate as an interface between an enclosure housing and a cover, lid, or door of the enclosure housing. An example of a joint apparatus is a hinge joint. According to a common design, a hinge comprises two leafs, a knuckle, and a pintel. The two leafs are typically moving plates that are securely attached via screws or other fasteners. One leaf is attached to the cover and the other attached to the enclosure housing. The knuckle is generally a hollow tube that runs down the middle of the hinge, with separate portions of the tube being alternately coupled to respective leafs such that when mated, the central hollow tube is constructed. The pintel is a cylindrical-shaped plug or rod that is placed through the hollow center of the knuckle to securely couple the two leafs together.

SUMMARY OF THE INVENTION

One aspect of the invention is an attachment system that operates as a joint or interface between a lid or cover and an enclosure housing. The attachment system can removably attach a lid or cover to an enclosure housing, while allowing for the lid or cover to pivot open from the enclosure housing.

Another aspect of the invention is an attachment system that attaches a lid or cover to an enclosure housing wherein the attachment system allows for the lid or cover to slide open from the housing or enclosure, exposing an interior of the enclosure housing.

Yet another aspect of the invention is an attachment system that attaches a lid or cover to a housing or enclosure wherein lid or cover can to be slid in a direction along the surface of the enclosure hosing and be completely removed from the enclosure housing.

Still another aspect of the invention is an attachment system that attaches a lid or cover to a housing or enclosure in a manner that allows hinging or pivoting, but does not require permanent fastening of leaf elements (e.g., with screws or the like). Thus, the joint between the cover and the housing can be leafless and can facilitate exposing an interior of the enclosure by either pivoting/hinging open or by sliding open.

These and various other advantages and features of novelty which characterize the invention are pointed out with particularity in the claims that follow and form a part hereof. However, for a better understanding of the invention, its advantages, and the objects obtained by its use, reference should be made to the drawings which also form a further part hereof, and to accompanying descriptive matter, in which there are illustrated and described specific examples of an apparatus in accordance with the invention.

BRIEF DESCRIPTION OF THE DRAWINGS

The invention will be more fully understood by reference to the following drawings which are for illustrative purposes only:

FIGS. 4A and 4B are perspective views of an enclosure assembly with a cover partly slid open in accordance with certain embodiments of this disclosure.

DETAILED DESCRIPTION OF THE INVENTION

Overview

Figure 1:
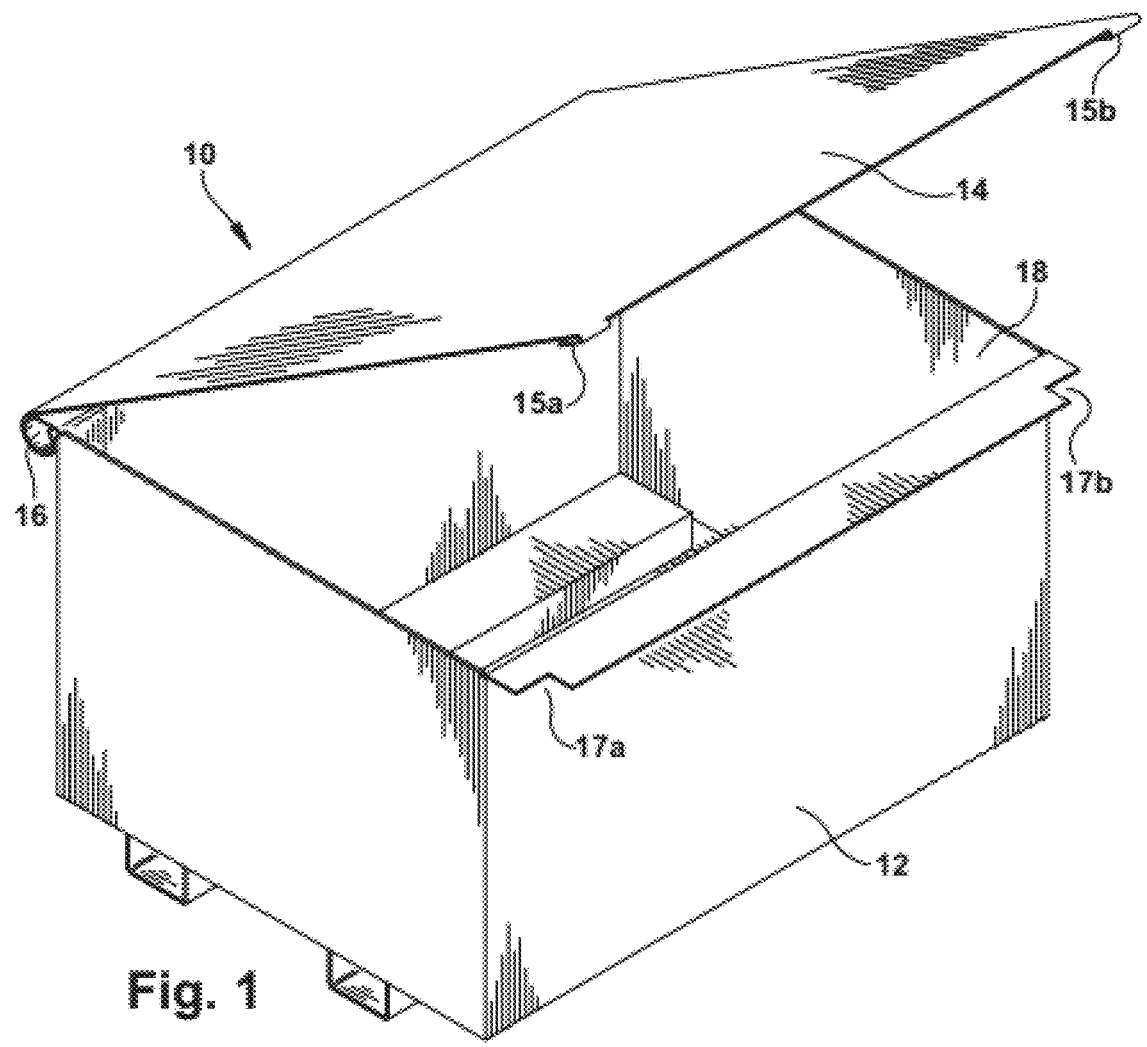
FIG. 1 is a perspective view of an enclosure assembly with the cover partly swung open from the enclosure housing in accordance with certain embodiments of this disclosure.

Enclosure assemblies are universally used to secure and protect its contents such as delicate electronics of a control box. Accessibility to the enclosure assembly, such as to make repairs or perform diagnostics, is an essential function of the enclosure assembly, but often times the location of these enclosure assemblies are in difficult-to-reach locations that are often cramped or constrained by other structures. Thus, often, even if the enclosure assembly can be reached, the cover may not be able to be easily removed in the way it was designed because of unforeseen structures being in the way or not enough clearance space to open the cover in the manner designed.

Thus, the function of accessibility is essential, and typically accomplished using a lid or cover in conjunction with the enclosure housing. Such lids or covers are attached to the enclosure housing by either relatively permanent or temporary means. Relatively permanent systems of attaching a cover to its enclosure housing may include screws, nuts and bolts, welding and the like. A relatively permanent attachment renders the enclosure's opening practically inaccessible in the field as the cover cannot be quickly removed and/or removed without the use of tools. Furthermore, even if removed, it is less likely that, after access, the cover will be reattached, leaving the contents exposed thereafter. On the other hand, temporary attachment systems are typically snap-type fittings or hinges. Snap-type fittings secure the lid over the opening of the enclosure housing and allow for the cover's removal therefrom by unsnapping the cover from the enclosure housing to provide access to the space within the enclosure. Hinges allow the cover to swing away from the enclosure housing to which it is attached, thereby providing access to the space within the enclosure.

A problem exists with current attachment systems as they are based on different design concepts that require differing manufacturing techniques, and a multitude of different designs increases manufacturing and inventory costs. Moreover, the currently known attachment systems fail to provide the flexibility when accessing the space within the enclosure to either remove the cover in its entirety or just swing the cover away from the enclosure housing. For example, hinge attachment systems can be problematic in the event there is not enough room for the cover to pivot open (e.g., cramped spaces at the control box or other enclosure setting). Snap-type systems are generally less secure and/or protective and the cover may not be reattached after removal.

Accordingly, there is a need for an enclosure assembly that offers the flexibility of a cover that can swing open with an attachment system and/or slide open either partially or be removed completely from the enclosure housing for access to the space within the enclosure. A single attachment system solving these challenges can meet the needs of all the aforementioned various applications and minimizes costs of manufacturing, inventory, and the like.

Referring more specifically to the drawings, for illustrative purposes the present invention is generally shown in a first embodiment of the leafless joint apparatus with respect to FIG. 1 through FIG. 7. A second embodiment of the leafless joint apparatus is generally shown with respect to FIG. 8 through FIG. 11. It will be appreciated that the apparatus may vary as to configuration and as to details of the parts without departing from the basic concepts as disclosed herein.

Figure 2:
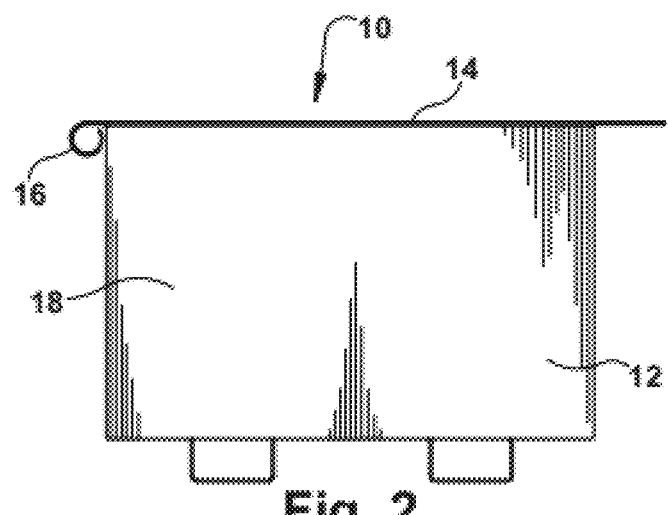
FIG. 2 is a side view of the enclosure assembly in accordance with the present invention with the cover closed in accordance with certain embodiments of this disclosure.
Figure 3:
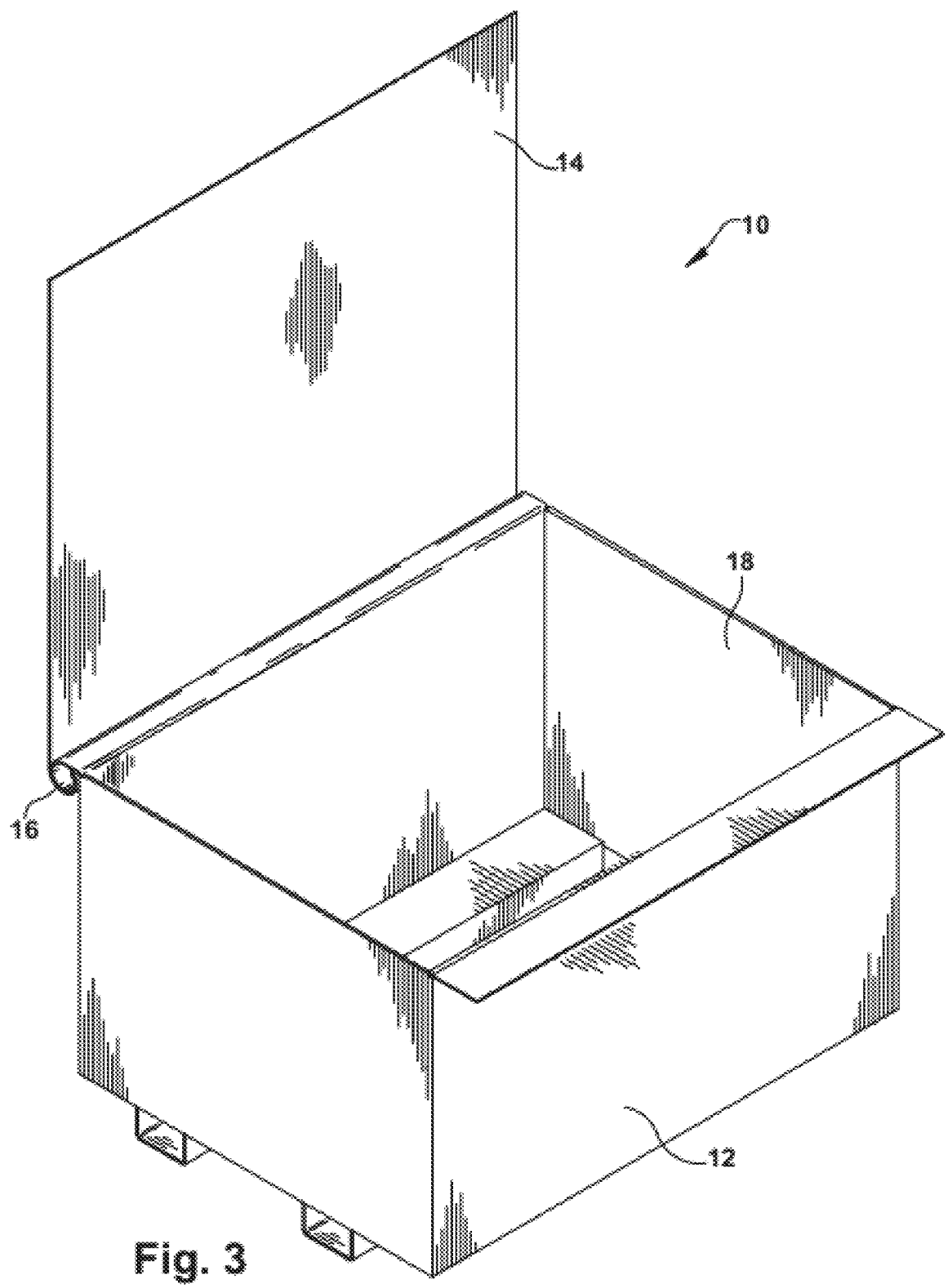
FIG. 3 is a perspective view of the enclosure assembly shown in FIG. 1 with the cover mostly swung open in accordance with certain embodiments of this disclosure.

Referring first to FIG. 1 through FIG. 3, an enclosure assembly 10 embodying the present invention is generally shown. Enclosure assembly 10 generally comprises an enclosure housing 12, an enclosure cover 14 and an attachment system 16 for attaching enclosure cover 14 to the enclosure housing 12. Enclosure cover 14 is shown in a partly swung open position from the enclosure housing 12 thereby providing access to a space 18 within enclosure housing 12. Referring now to FIG. 2, a side view of the enclosure assembly 10 of the present invention is generally shown. As can be seen in the figure, enclosure cover 14 is shown on a completely closed position relative to enclosure housing 12 thereby sealing space 18 within enclosure housing 12. The sealing of space 18 of the enclosure housing 12 may provide an airtight, watertight, or hermetic seal to isolate the space 18 from the environment as necessary, depending on the application. The composition of materials used in the fabrication of enclosure assembly 10 may be metal, plastic, wood, or any suitable material structurally suitable for its intended purpose. In FIG. 3, enclosure assembly is shown with enclosure cover 14 in a mostly swung open position relative to enclosure housing 12 thereby providing full access to space 18 within enclosure 12. As seen in FIG. 1, enclosure cover 14 may include rolled tabs 15a and 15b that clear notches 17a and 17b disposed on a lip that extends from enclosure housing 12 thereby allowing enclosure cover 14 to swing away from enclosure housing 12. It can be seen that when enclosure cover 14 is on the closed position, sliding enclosure cover 14 in either longitudinal direction will cause rolled tabs 15a and 15b to engage the lip, thereby preventing enclosure cover 14 from swinging open.

Figure 4B:
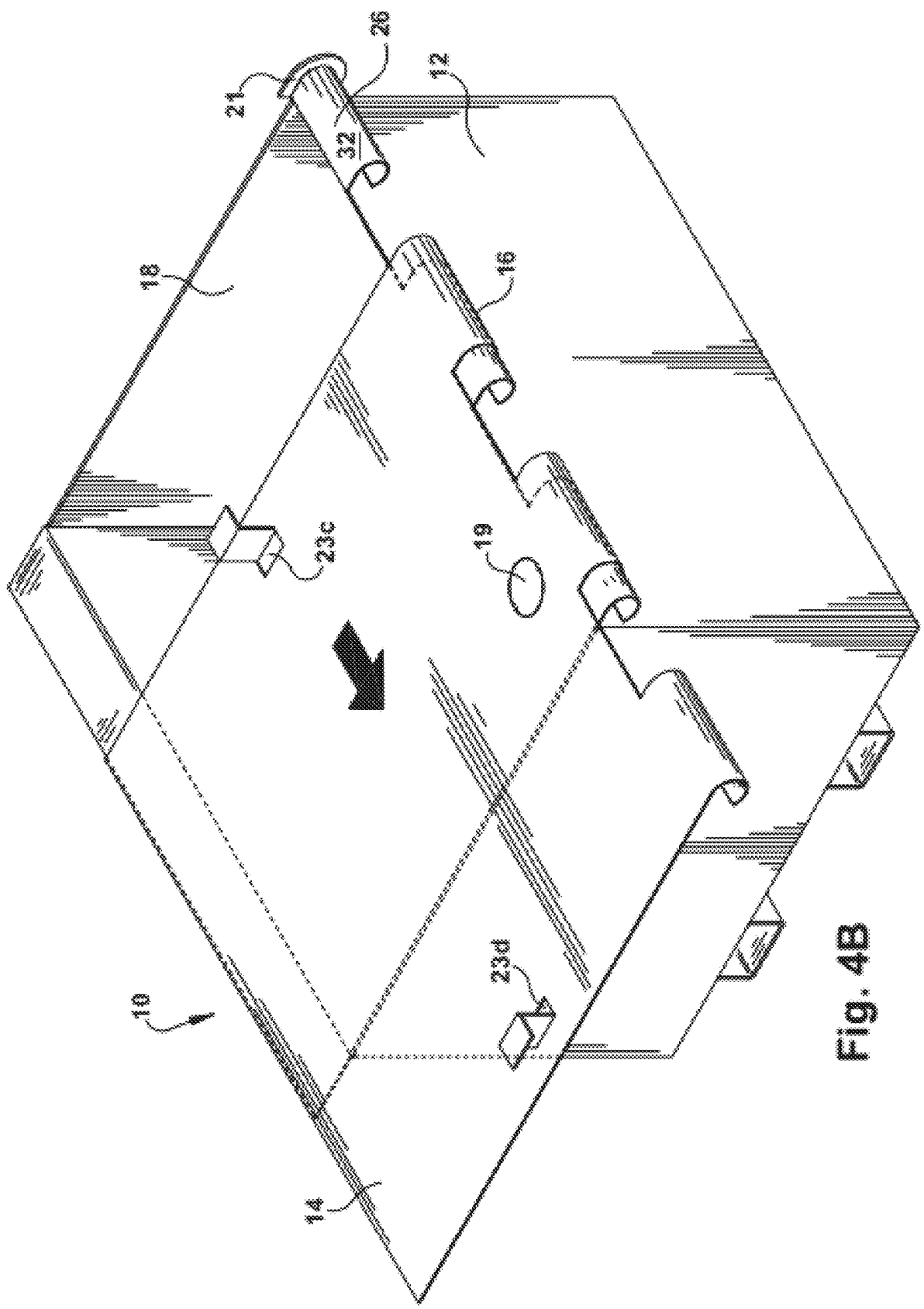

Referring now to FIGS. 4A and 4B, enclosure assembly 10 is shown, wherein enclosure cover 14 is depicted in a partially slid open position relative to enclosure housing 12. In this position shown, partial access to space 18 within enclosure housing 12 is provided. The arrow shown in the figure is a longitudinal direction that exemplifies how enclosure cover 14 may be slidably moved longitudinally relative to enclosure housing 12 to provide partial access to space 18. It is contemplated the cover 12 may also be slidably moved in a longitudinal direction to the opposite of that shown by the arrow to also provide partial access to space 18. When enclosure cover 14 is slidably moved beyond the edge of enclosure housing 12 in either direction, enclosure cover 14 may be completely detached from enclosure housing 12 thereby providing full access to space 18 within enclosure 12. Cylindrical receiving member 26 (described below) may also incorporate a flange 21 disposed at one end to limit the longitudinal movement of enclosure cover 14 and/or to maintain enclosure cover 14 in a fixed position relative to enclosure housing 12. It is contemplated that knockout hole(s) 19 may be incorporated in enclosure housing 12 or enclosure cover 14 that will offer access of the internal components to external elements, such as electrical wiring, plumbing, computer displays, etc. Bent tabs 23 may also be incorporated on enclosure cover 14 and disposed at approximately each longitudinal end thereof. Bent tabs 23 may be bent upward away from space 18 as shown in 23c and 23d or downward into space 18 as shown in 23a and 23b of enclosure housing 12. For example, when bent tab 23a is bent upward, it may serve as a grab handle for enclosure cover 14, and when bent tab 23b is bent downward, it locks enclosure cover 14 in place and prevents its sliding relative to enclosure housing 12.

Figure 5:
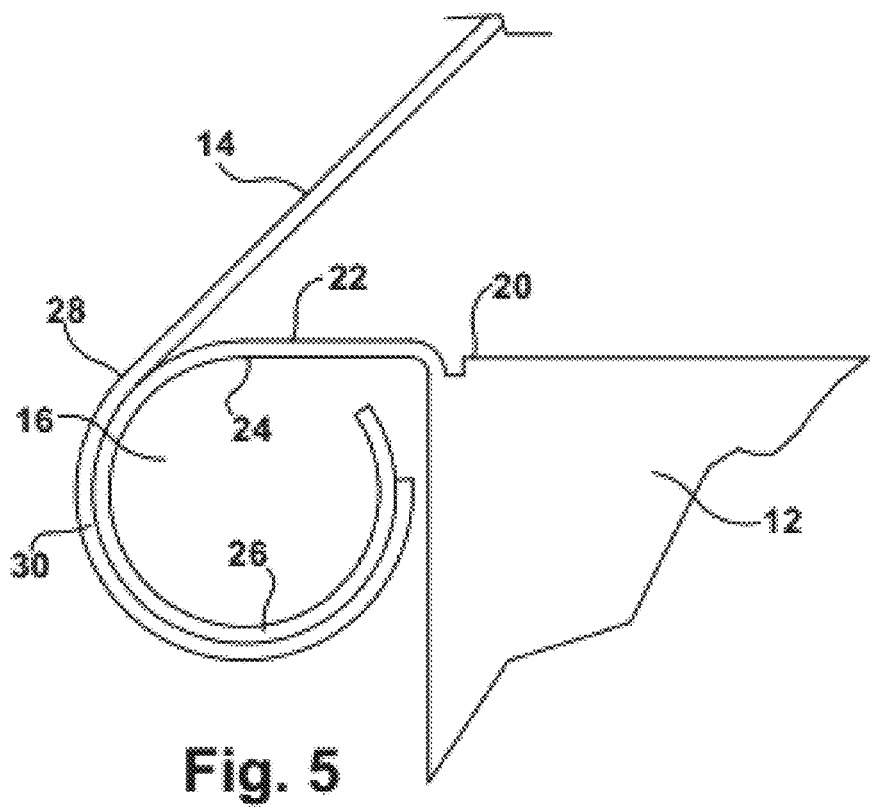
FIG. 5 is an enlarged view of an attachment system of the enclosure assembly in accordance with certain embodiments of this disclosure.

Referring to FIG. 5, an enlarged view of attachment system 16 of enclosure assembly 10 is generally depicted. At least one edge 20 of enclosure housing 12 comprises a lip 22. The distal end 24 of lip 22 extends to and forms a cylindrical receiving member 26. At least one side 28 of enclosure cover 14 extends to and forms a cylindrical engaging member 30. Cylindrical engaging member 30 surrounds and slidably engages cylindrical receiving member 26 concentrically, while allowing enclosure cover 14 to pivot around a central axis of cylindrical receiving member 26, thereby causing enclosure cover 14 to swing open or close relative to enclosure housing 12.

Thus, in the context of hinge devices, cylindrical engaging member 30 serves the function of a hinge knuckle, whereas cylindrical receiving member 26 serves the function of a hinge pintel or pin. In this case, the "knuckle" is coupled to, or integrated with, enclosure cover 14, whereas the "pintel" is coupled to, or integrated with, enclosure housing 12. It is appreciated that other embodiments can exist in which this implementation is reversed such as the "knuckle" being integrated with enclosure housing 12 and the "pintel" being integrated with enclosure cover 14. Regardless, because the "pintel" and "knuckle" are designed to be integrated with distinct elements, one being enclosure housing 12 and the other being enclosure cover 14, there is no need for separate "leaf" elements as in conventional hinges. Rather, the "pintel" (e.g., cylindrical receiving member 26) is intended to slide within the "knuckle" (e.g., cylindrical engaging member 30) as enclosure cover 14 is slide along the longitudinal direction of enclosure housing 12.

Figure 6:
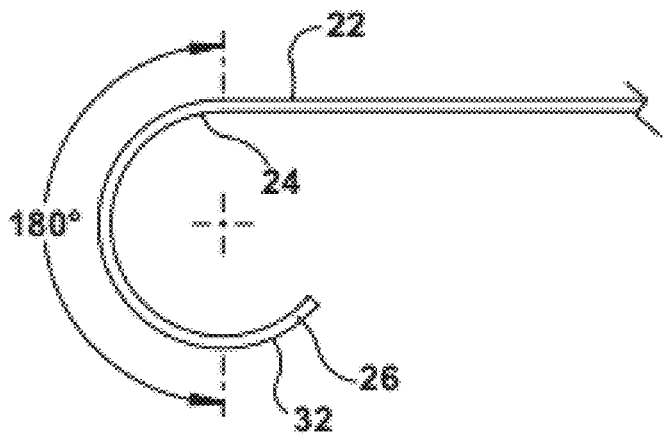
FIG. 6 is an enlarged view of a component of the attachment system shown in accordance with certain embodiments of this disclosure.

In FIG. 6, cylindrical receiving member 26 comprises a curved outer bearing surface 32 that extends about 180 degrees around from distal end 24 of lip 22 as shown. Those skilled in the art will appreciate that the angle that outer bearing surface 32 extends may be somewhat greater to or less than 180 degrees but primarily sufficient to receive and allow articulation of cylindrical receiving member 26 relative to cylindrical engaging member 30. Cylindrical receiving member 26 may be a rolled sheet panel as depicted or also a solid cylindrical piece.

Figure 7:
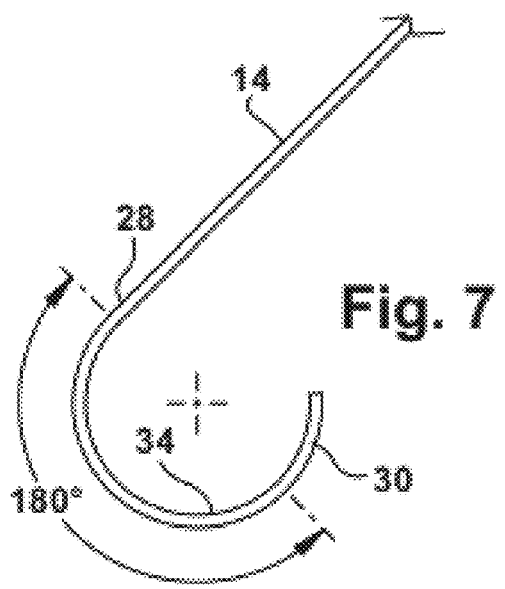
FIG. 7 is an enlarged view of a component of the attachment system shown in accordance with certain embodiments of this disclosure.

In FIG. 7, cylindrical engaging member 30 comprises a curved inner bearing surface 34 that extends at least greater than about 180 degrees from side 28 of enclosure cover 14. Inner bearing surface 34 of cylindrical engaging member 30 articulates directly with outer bearing surface 32 of cylindrical receiving member 26 and allows enclosure cover 14 to pivot around a central axis of cylindrical receiving member 26, thereby causing enclosure cover 14 to swing open or close relative to enclosure housing 12. Additionally, the articulation of inner bearing surface 34 with outer bearing surface 32 also allows enclosure cover 14 to move longitudinally relative to enclosure housing 12. Flange 21 of cylindrical receiving member 26 may serve as a stop to prevent enclosure cover 14 from longitudinally traversing therebeyond. Curved inner bearing surface 34 must extend at least greater than 180 degrees around to adequately secure cylindrical engaging member 30 to cylindrical receiving member 26 and provide their relative articulation. The outer diameter of cylindrical receiving member 26 may vary so long as it allows for matching engagement with the inner radius of cylindrical engaging member 30 and proper articulation between both components.

Accordingly, it can be seen that this invention provides for enclosure assembly 10 that offers the flexibility for enclosure cover 14 that can function to both swing open and/or slide open either partially or be removed completely from enclosure housing 12 for access to space 18 within the enclosure housing 12 as a result of the engagement and articulation of cylindrical receiving member 26 with cylindrical engaging member 30. Additionally, it can be seen that attachment system 16 of the present invention provides for two degrees of freedom, namely longitudinally translation and axial rotation of cylindrical receiving member 26 relative to cylindrical engaging member 30. The longitudinally translation and axial rotation of cylindrical receiving member 26 relative to cylindrical engaging member 30 may also occur simultaneously and not necessarily in separate discrete movements.

Figure 8:
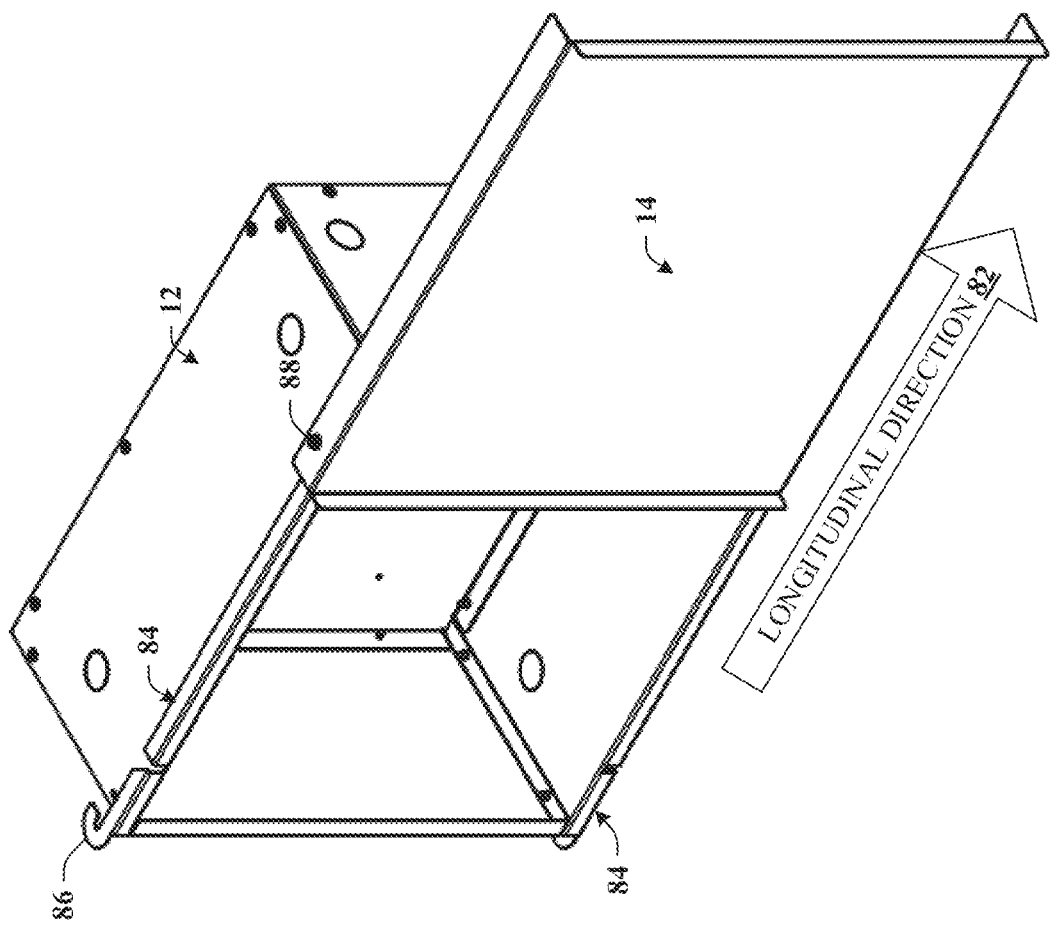
FIG. 8 illustrates, with regard to the leafless joint apparatus, the enclosure cover sliding to an open position, exposing an interior of the enclosure housing, as the enclosure cover pivots at the back wall of the enclosure housing in accordance with certain embodiments of this disclosure.
Figure 9:
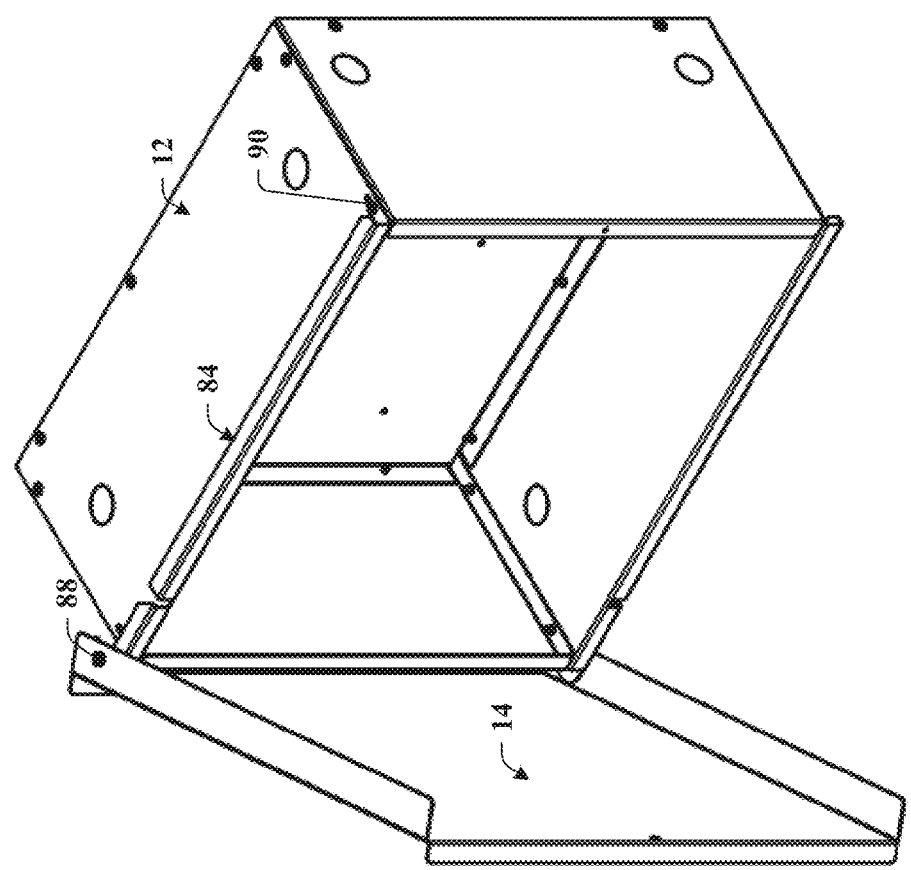
FIG. 9 illustrates, with regard to the leafless joint apparatus, the enclosure cover pivoting to an open position, exposing an interior of the enclosure housing, as the enclosure cover is slid in the longitudinal direction in accordance with certain embodiments of this disclosure.
Figure 10:
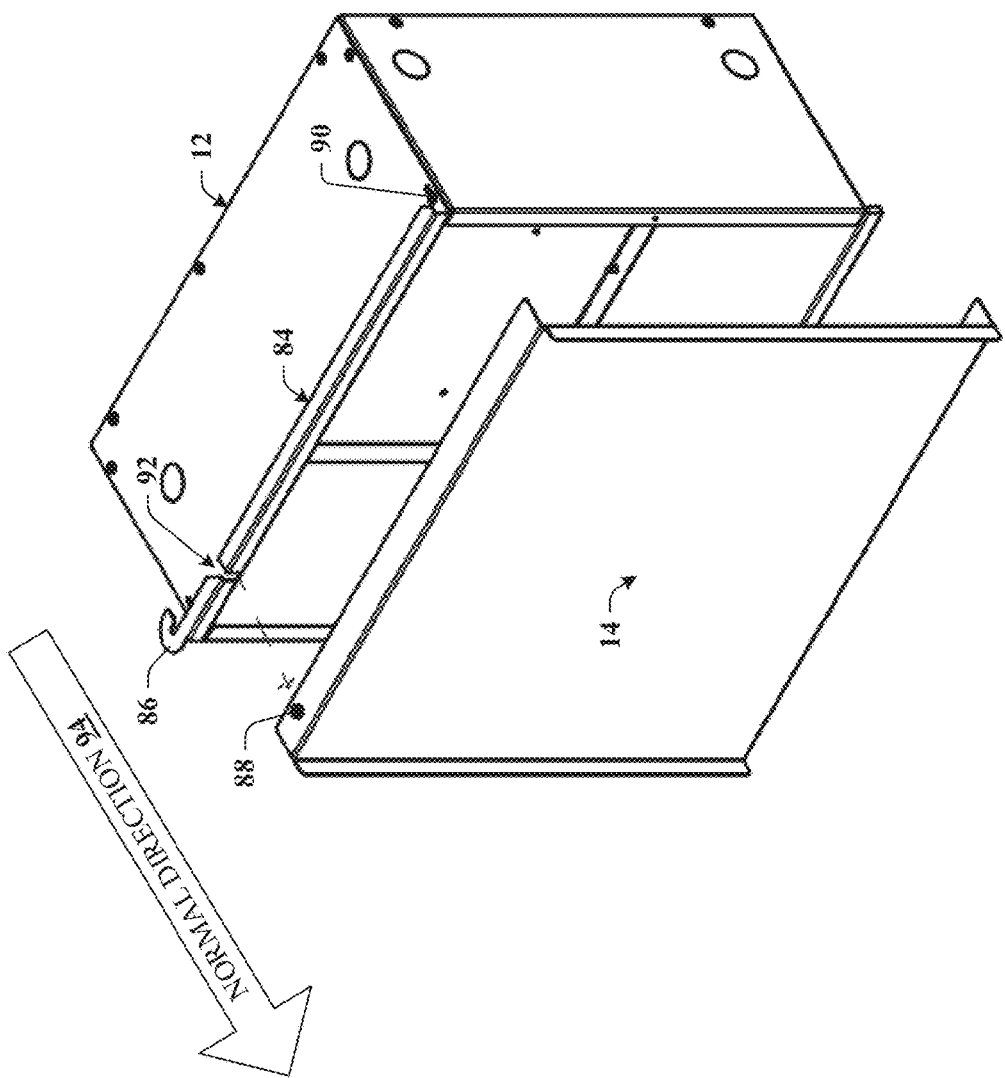
FIG. 10 illustrates, with regard to the leafless joint apparatus, the enclosure cover being detached from the enclosure housing according to a detachment procedure in accordance with certain embodiments of this disclosure.
Figure 11:
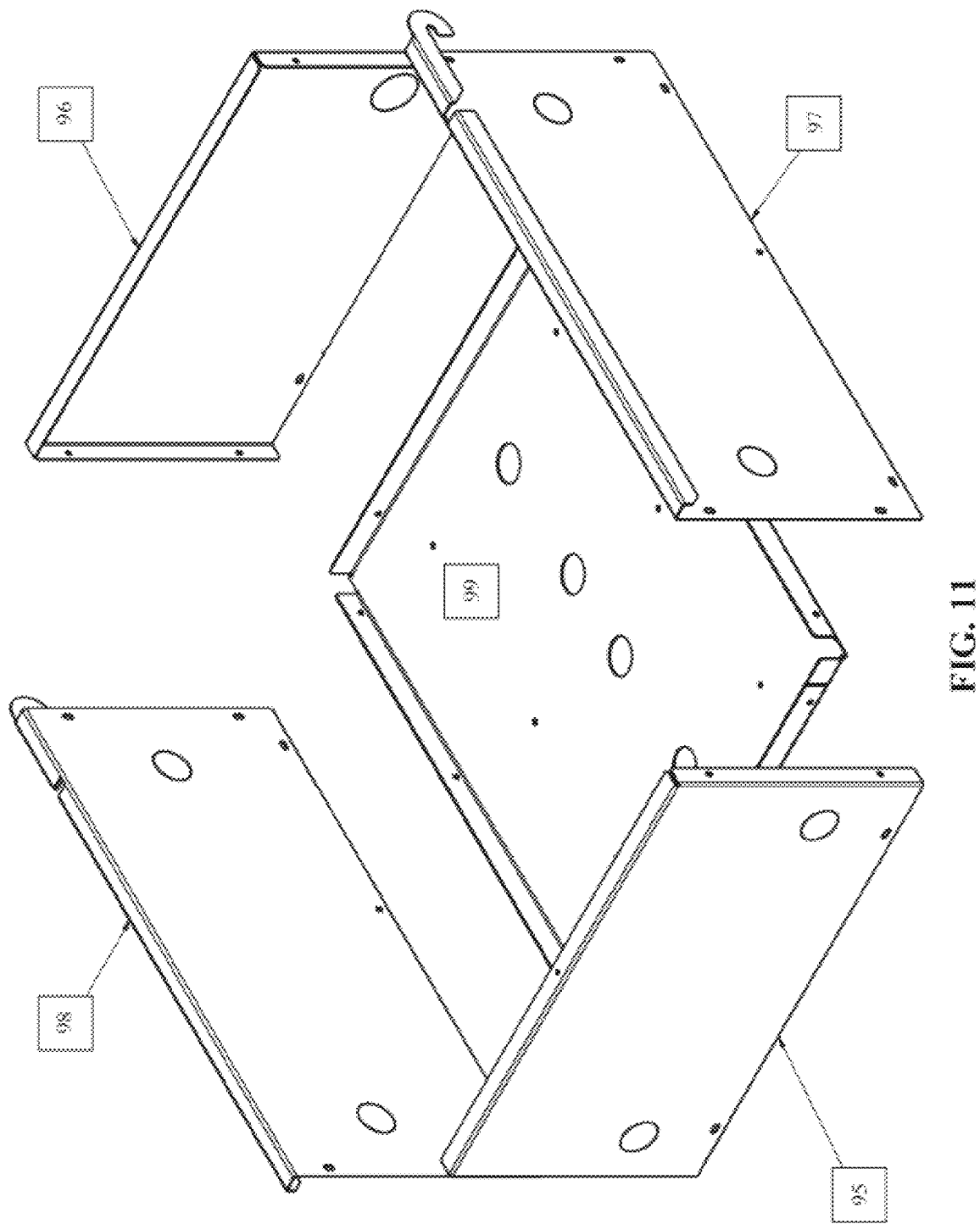
FIG. 11 described is an assembly technique that can reduce manufacturing and/or inventory costs in accordance with certain embodiments of this disclosure.

Turning now to FIGS. 8-11, a second example embodiment of the leafless joint apparatus is depicted. Once more the leafless joint apparatus or attachment system disclosed herein can act as a joint or interface between enclosure housing 12 and enclosure cover 14. FIG. 8 depicts an example of enclosure cover 14 being in an open position via a sliding procedure. FIG. 9 illustrates an example of enclosure cover 14 being in an open position via a pivoting procedure. FIG. 10 illustrates an example of enclosure cover 14 being detached from enclosure housing 12. FIG. 11 illustrates an assembly procedure that can reduce costs of manufacture and inventory.

Referring specifically to FIG. 8, with regard to the leafless joint apparatus, enclosure cover 14 is illustrated to be in an open position (e.g., exposing an interior of enclosure housing 12) after enclosure cover 14 is slid in longitudinal direction 82 in accordance with certain embodiments of this disclosure. Such can be facilitated by tracks 84 situated on opposites sides of enclosure housing 12. Tracks 84 extend in longitudinal direction 82 and provide a constrained structure by which enclosure cover 14 can slide open or closed. Contact between tracks 84 and elements of enclosure cover 14 can ensure that enclosure cover 14 can only move parallel or anti-parallel with longitudinal direction 82. This contact can be mated in any suitable way, and can include one or more interior tabs (not shown, but see tabs 15a and 15b of FIG. 1) on an inner surface of enclosure cover 14 and/or contact with pintel 88 (e.g., that makes contact with an underside of tracks 84).

At one side of track 84, curved portion 86 can exist. Curved portion 86 can provide multiple functions. First, curved portion 86 can function as a "knuckle" and can mate with pintel 88 in that regard. Such allows the joint to pivot or hinge, as is further discussed in connection with FIG. 9. Second, curved portion 86 can further function as a stop to prevent enclosure cover 14 from sliding beyond the fully closed position. In other words, pintel 88 cannot slide passed curved portion 86 in a direction anti-parallel to longitudinal direction 82.

On the opposite end of track 84, in some embodiments, a stop element (not shown, but see element 90 of FIG. 9) can exist to prevent enclosure cover 14 from sliding off tracks 84. For instance, when fully open, pintel 88 (or another element) can contact stop element 90 to prevent further movement in longitudinal direction 82.

Unlike with the first embodiment (e.g., FIGS. 1-7) of the leafless joint apparatus in which continual sliding eventually allows detachment of enclosure cover 14, in this embodiment, detachment is accomplished according to a different mechanism, which is further detailed in connection with FIG. 10. Thus, in this embodiment, if there is not enough space to slide enclosure cover 14 in longitudinal direction 82 a sufficient amount to provide the desired level of accessibility, then enclosure cover 14 can still be removed by leveraging space in a different direction. Further, enclosure cover 14 might also pivot open, which leverages yet another region of space for clearance, as illustrated with reference to FIG. 9.

In FIG. 9, with regard to the leafless joint apparatus, enclosure cover 14 is illustrated to be in an open position (e.g., exposing an interior of enclosure housing 12) as enclosure cover 14 is pivoting at the back wall of enclosure housing 12 in accordance with certain embodiments of this disclosure. Such can be facilitated by pintel 88 rotating within curved portion 86 (see FIG. 8). In some embodiments, enclosure cover 14, once at least partially open according to the pivoting procedure, is prevented (e.g., flaps on the back side of enclosure cover 14 that contact curved portion 86) from sliding in longitudinal direction 82 until changed to the closed position or state. Likewise, in some embodiments, once at least partially open according to the sliding procedure (e.g., illustrated in FIG. 8), the aforementioned interior tabs of enclosure cover 14, or another element that contacts tracks 84 can prevent enclosure cover from pivoting open until changed to the closed position or state. It is further observed that, while curved portions 86 can operate as knuckles, these knuckles do not comprise a hollow tube that runs the length of the joint, as is the case with typical hinge joints. Rather, curved portions 86 are limited to the placement of tracks 84, and therefore the cover slides in longitudinal direction 82 that differs in orientation from the first embodiment of leafless joint apparatus.

In FIG. 10, with regard to the leafless joint apparatus, enclosure cover 14 is illustrated to be detached from enclosure housing 12 according to a detachment procedure in accordance with certain embodiments of this disclosure. Such can be facilitated due to cut 92 in tracks 84. As noted previously, during the sliding procedure, pintel 88 contacts the underside of tracks 84, thereby preventing the enclosure cover 14 from being detached or otherwise moving in normal direction 94. In some embodiments, normal direction 94 can be orthogonal to longitudinal direction 82. However, once the sliding procedure is initially started such that pintal 88 moves a sufficient amount in longitudinal direction 82 to coincide with cut 92, enclosure cover 14 can now be detached in normal direction 94 as pintel 88 transitions through cut 92. It is appreciated that, depending on implementation, cut 92 can be situated at any position along tracks 84, including a position that coincides with the closed state such that from the closed state, the detachment procedure is available without first performing all or a portion of the sliding procedure. As illustrated, cut 92 can have tapered walls such that pintel 88 can be easily navigated through cut 92, but otherwise would easily continue along tracks 84 in the longitudinal direction 82 depending on the direction of forces applied by the operator to enclosure cover 14. Reattaching enclosure cover 14 can be provided by sliding pintel 88 through cut 92 in the opposite of normal direction 94.

Hence, the design of leafless joint apparatus can be configured to removably attach enclosure cover 14 to enclosure housing 12. Further, leafless joint apparatus can be configured to perform (i) a detachment procedure in which the enclosure cover detaches from the enclosure housing (e.g., see FIG. 10), (ii) a pivoting procedure in which the enclosure cover pivots at the back wall, exposing the volume of space (e.g., see FIG. 9); and (iii) a sliding procedure in which the enclosure cover slides along the top side of the enclosure housing, exposing the volume of space (e.g., see FIG. 8). In some embodiments, leafless joint apparatus can be configured to concurrently enable all or a portion of these different procedures. For example, initially assuming the closed state, leafless joint apparatus can concurrently facilitate the sliding procedure, the pivoting procedure, or, in some embodiments, the detachment procedure. In some embodiments, the detachment procedure is first prefaced with the sliding procedure, either by transitioning beyond the fully open state in order to detach (e.g., see FIG. 4A or 4B) or by transitioning to a partially open state that coincides with the location of cut 92 (e.g., see FIG. 10).

With reference now to FIG. 11, described is an assembly technique that can reduce manufacturing and/or inventory costs in accordance with certain embodiments of this disclosure. As illustrated, enclosure housing 12 can comprise front panel 95, back panel 96, two side panels 97 and 98 and bottom panel 99. One technique for assembly can be to use pop rivets as follows. Align front panel 95 and back panel 96 with bottom panel 99 according to locations of the pop rivets, but do not pull or activate the pop rivets. Next, align side panels 97 and 98 to bottom panel 99 according to locations of the pop rivets. Once all the panels are aligned, pull or activate all pop rivets to secure all panels in place.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus, comprising:
a housing structure comprising an opening that provides access between an interior of the housing structure and an exterior of the housing structure;
a hatch structure that, in a first state, covers the opening and, in a second state, exposes at least a portion of the opening; and
an attachment mechanism, comprising a track structure having an arced portion at one end, that is configured to facilitate a transition of the hatch structure between the first state and the second, comprising:
a first transition between the first state and the second state that occurs in response to the hatch structure rotating about an axis at the arced portion;
a second transition between the first state and the second state that occurs in response to the hatch structure sliding along the track structure; and
a third transition between the first state and the second state that occurs in response to the hatch structure being removably attached to the housing structure.

2. The apparatus of claim 1, wherein the third transition occurs in response to the hatch structure sliding along the track structure in a direction toward the arced portion.

3. The apparatus of claim 1, wherein the third transition occurs in response to a pintel of the attachment mechanism transitioning a cut of the track structure.

4. The apparatus of claim 3, wherein the pintel of the attachment mechanism transitions the cut of the track structure in a direction perpendicular to the track structure.

5. The apparatus of claim 1, wherein the attachment mechanism is configured to facilitate a fourth transition between the first state and the second state that occurs in response to the hatch being detached from the housing structure.

6. An apparatus, comprising:
an attachment mechanism configured to removably attach a first element to a second element, the attachment mechanism comprising:
a track structure that is coupled to the first element; and
a pintel, coupled to the second element, configured to interface with the track structure;
and wherein the attachment mechanism is configured to:

perform a pivoting procedure in which the second element pivots, relative to the first element, about an axis through the pintel; and perform a detachment procedure in which the second element detaches from the first element.

7. The apparatus of claim 6, wherein the attachment mechanism is further configured to perform a sliding procedure in which the second element slides, relative to the first element, in a direction of the track structure.

8. The apparatus of claim 7, wherein the track structure comprises a curved portion at one end.

9. The apparatus of claim 8, wherein the pivoting procedure occurs in response to the pintel being situated in the curved portion of the track structure.

10. The apparatus of claim 8, wherein the sliding procedure comprising a transition of the pintel to the curved portion of the track structure, resulting in the second element covering an opening of the first element.

11. The apparatus of claim 8, wherein the sliding procedure comprising a transition of the pintel from the curved portion of the track structure, resulting in the second element exposing at least a portion of an opening of the first element.

12. The apparatus of claim 8, wherein the track structure comprises a cut element configured to facilitate a transition of the pintel in a first direction that differs from the direction of the track structure.

13. The apparatus of claim 12, wherein the first direction is substantially perpendicular to the direction of the track structure.

14. An apparatus, comprising:

an attachment mechanism configured to interface a first element to a second element, the attachment mechanism comprising:

a track structure that is coupled to the first element; and a pintel, coupled to the second element, configured to interface with the track structure;

and wherein the attachment mechanism is configured to:

perform a pivoting operation in which the second element pivots, relative to the first element, about an axis through the pintel; and perform a sliding operation in which the second element slides, relative to the first element, in a direction of the track structure.

15. The apparatus of claim 14, wherein the track structure comprises a curved portion at one end and a cut element situated along a length of the track structure.

16. The apparatus of claim 15, wherein the pivoting operation occurs in response to the pintel being situated in the curved portion of the track structure.

17. The apparatus of claim 15, wherein the sliding operation comprising a transition of the pintel to the curved portion of the track structure, resulting in the second element covering at least a portion of an opening of the first element.

18. The apparatus of claim 15, wherein the sliding operation comprising a transition of the pintel from the curved portion of the track structure, resulting in the second element exposing at least a portion of an opening of the first element.

19. The apparatus of claim 15, wherein the attachment mechanism if further configured to perform an attachment operation in which the pintel transitions through the cut element to attach the second element to the first element.

20. The apparatus of claim 15, wherein the attachment mechanism if further configured to perform a detachment operation in which the pintel transitions through the cut element to detach the second element from the first element.

* * * * *